(12) United States Patent
Kim et al.

(10) Patent No.: US 8,331,704 B2
(45) Date of Patent: Dec. 11, 2012

(54) CODING METHOD AND CODING APPARATUS

(75) Inventors: Han-Sang Kim, Suwon-si (KR);
Young-Hun Joo, Yongin-si (KR);
Kwang-Pyo Choi, Anyang-si (KR);
Kyung-Ho Chae, Seoul (KR); Denis Gorodetskii, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 725 days.

(21) Appl. No.: 12/508,772

(22) Filed: Jul. 24, 2009

(65) Prior Publication Data

US 2010/0021073 A1 Jan. 28, 2010

(30) Foreign Application Priority Data

Jul. 25, 2008 (KR) ........................ 10-2008-0072920

(51) Int. Cl.
*G06K 9/36* (2006.01)

(52) U.S. Cl. ..................................................... 382/236
(58) Field of Classification Search .......... 382/232–233, 382/236, 238–240, 247–253; 348/394.1–395.1, 348/400.1–403.1, 408.1–416.1, 430.1–431.1; 375/240.03, 240.12–240.23
See application file for complete search history.

(56) References Cited

U.S. PATENT DOCUMENTS

| | | | |
|---|---|---|---|
| 8,040,950 B2 * | 10/2011 | Ha et al. ................ | 375/240.16 |
| 2002/0015446 A1 * | 2/2002 | Miyaji et al. ............ | 375/240.16 |
| 2004/0228410 A1 * | 11/2004 | Ameres et al. .......... | 375/240.18 |
| 2004/0240555 A1 * | 12/2004 | De With et al. ......... | 375/240.16 |

* cited by examiner

*Primary Examiner* — Jose Couso
(74) *Attorney, Agent, or Firm* — Sughrue Mion, PLLC

(57) ABSTRACT

Provided are methods and apparatuses for coding a motion vector by a multimedia image codec. The method including: calculating and storing difference vectors which represent differences between adjacent motion vectors of image data; selecting a central axis of the stored difference vectors based on trend information of the difference vectors; transforming the difference vectors based on the central axis of the difference vectors; and performing bit coding using the axis-transformed difference vectors.

8 Claims, 4 Drawing Sheets

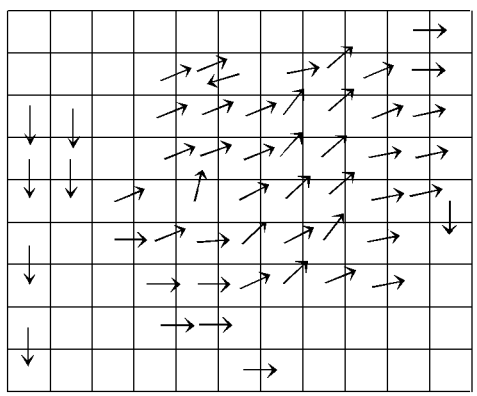
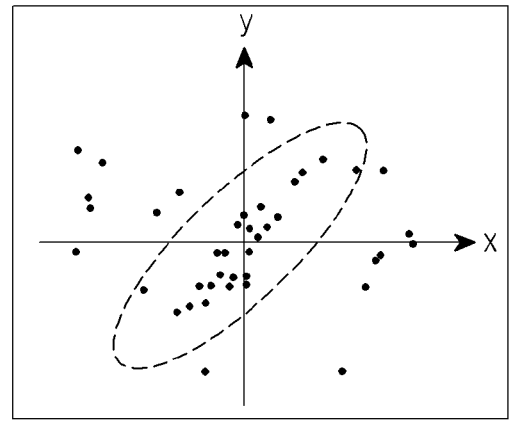
FIG.2A　　　　　　　　FIG.2B
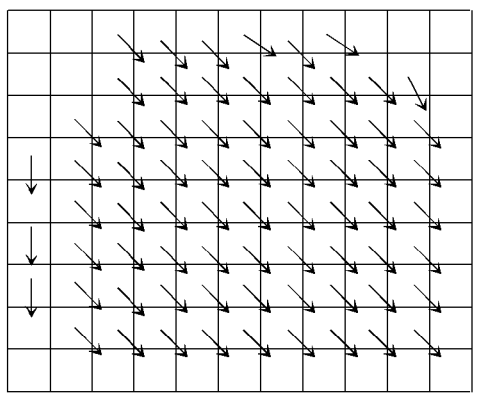
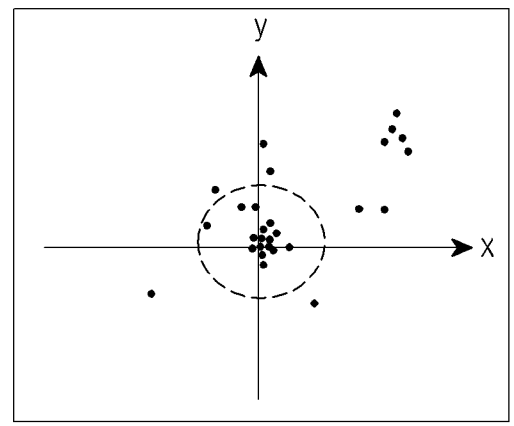
FIG.3A　　　　　　　　FIG.3B

CODING METHOD AND CODING APPARATUS

PRIORITY

This application claims priority from Korean Application No. 10-2008-0072920, filed in the Korean Intellectual Property Office on Jul. 25, 2008, the disclosure of which is hereby incorporated by reference.

BACKGROUND

1. Field of the Invention

Methods and apparatuses consistent with the present invention relate to coding a motion vector in a multimedia image codec, and more particularly to bit allocation for coding a motion vector.

2. Description of the Related Art

Various types of imaging media devices capable of transmitting images are available, the imaging media devices being able to transmit images at data rates which are mutually different. In addition, since terminals receiving an image from an imaging media device provide various resolutions to users, image data having data rates suitable for the terminals are required. To this end, a method for allowing an image data provider to hold and provide a plurality of pieces of image data according to the respective resolutions may be used.

However, this solution limits the available storage space. In contrast, when image data has been encoded using an image compression standard, the image data can be extracted according to the data rate of each media device and the resolution of the user terminal, and then provided to the user. Software or an algorithm for compressing or decompressing data, as described above, is called a codec.

Image codecs used in the multimedia field including a still image or moving image use a static bit allocation scheme for allocating a small number of bits based on the case of "(mvd_x, mvd_y)=(0,0)" regardless of the characteristics of the image, when coding the value of a difference vector "mvd", which represents the difference between adjacent motion vectors.

With respect to image data, such as a still image or moving image, in the multimedia field, the difference between the motion vectors of a screen image is designated as a difference vector "mvd," wherein the motion vector and the difference vector "mvd" may be expressed generally as "(mvd_x, mvd_y)" along the x and y axis in a two-dimensional coordinate plane.

According to a related art motion vector coding method used by an image codec, bits are allocated on the assumption that there are almost no difference vectors. Accordingly, bit coding efficiency is degraded when a camera (or an encoder) moves during the taking of a photograph, for example when panning (photographing a moving object with a fast shutter speed), zooming (taking a photograph while moving the focus of the camera), or when a subject moves (that is, when the difference vector is not equivalent to zero).

According to the related art motion vector coding method, bit allocation is performed based on the case where the difference vector between adjacent motion vectors is zero, in such a manner that the smallest number of bits are allocated when the difference vector is zero, and the larger the difference vector, the more the bits are allocated. As described above, according to the related art motion vector coding method, when image data includes the difference vectors having a tendency to be zero, the difference in the amount of data upon coding is small, but the amount of data upon coding increases when image data includes many difference vectors which have a tendency to be greater than zero.

SUMMARY

Aspects of the present invention provide an enhanced image data coding method by allocating bits according to the characteristics, such as that of the difference vectors of a photographed image.

In accordance with an aspect of the present invention, there is provided a method for coding a motion vector by a multimedia image codec, the method including: calculating difference vectors which are the differences between adjacent motion vectors forming image data; and axis-transforming the calculated difference vectors with respect to a central axis of the calculated difference vectors.

BRIEF DESCRIPTION OF THE DRAWINGS

The above and other aspects of the present invention will be more apparent from the following detailed description of exemplary embodiments taken in conjunction with the accompanying drawings, in which:

FIGS. 2A to 3B are graphs illustrating examples of the trends of difference vectors;

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may obscure the subject matter of the present invention.

Exemplary embodiments of the present invention relate to enhancing efficiency in bit coding, and to a coding method of using different bit coding schemes depending on the characteristics of the difference vectors between adjacent motion vectors of image data, which is a target for bit coding.

A difference vector "mvd_x, mvd_y" represents the difference between adjacent motion vectors included in image data, which corresponds to a still image or moving image constituted by a plurality of frames, and is used to enhance the compression ratio of an image codec.

Figure 1A:
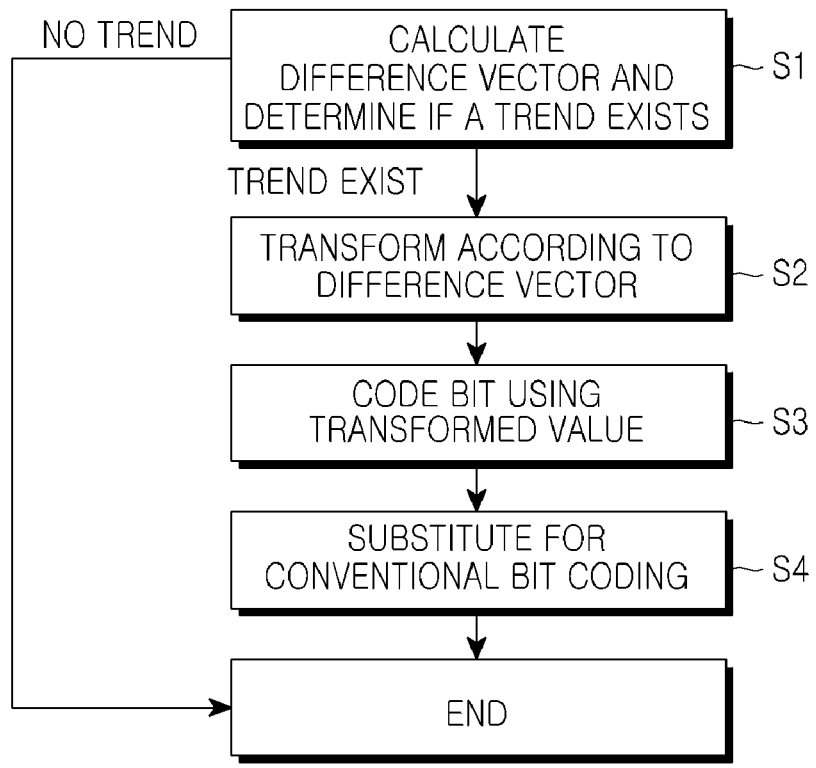
FIGS. 1A and 1B are flowcharts illustrating an example of applying a difference value between motion vectors to an encoder and a decoder according to an exemplary embodiment of the present invention.
Figure 1B:
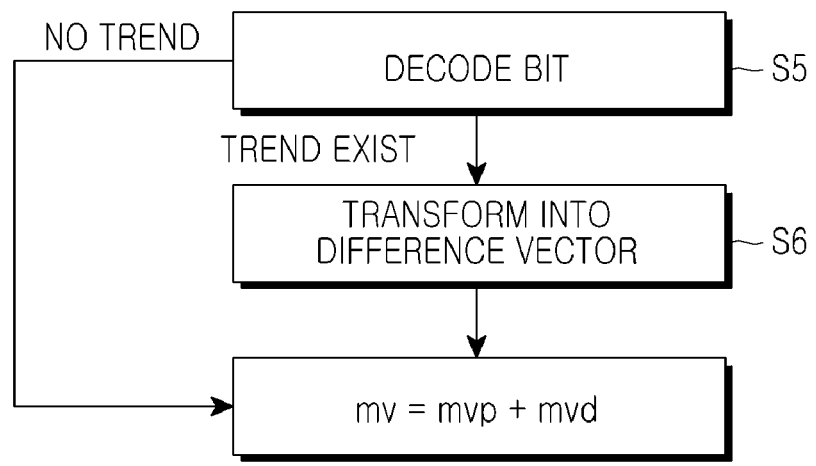

FIGS. 1A and 1B are flowcharts illustrating an example of applying a difference value between motion vectors to an encoder and a decoder according to an exemplary embodiment of the present invention. Specifically, FIG. 1A is a flowchart illustrating a coding method performed at the encoder side, and FIG. 1B is a flowchart illustrating a decoding method performed at the decoder side.

The method shown in FIG. 1A includes: calculating the difference vectors of image data to be coded and identifying the trend of the calculated difference vectors (S1); transforming the difference vectors using a function when a trend of the difference vectors is a value other than zero (S2); performing bit coding using the transformed difference vectors (S3); and substituting a result of the bit coding for an existing bit code (S4).

In identifying the trend of the difference vectors, when the difference vectors include a value of zero, which corresponds to a case where there is no trend, it is possible to employ the existing method of allocating the minimum number of bits to each difference vector including a value of zero, and allocating a larger number of bits as a difference vector has a greater value with respect to zero.

The distribution of difference vectors, from which a trend can be identified, will be described below with reference to FIGS. 2A to 4.

FIGS. 2A to 3B are graphs illustrating examples of the trends of difference vectors, wherein FIGS. 2A and 3A show examples of image data in which a plurality of difference vectors are schematically expressed, and FIGS. 2B and 3B show graphs in each of which the trend in the distribution of difference vectors in each corresponding drawing is expressed in a coordinate plane.

Arrows shown in FIGS. 2A and 3A correspond to difference vectors, and are examples where the difference between motion vectors in adjacent frames or adjacent pixels is schematically expressed. As shown in FIG. 2A, the difference vectors (i.e., arrows) point in different directions from each other.

Difference vectors of two-dimensional image data may be expressed in a coordinate plane defined by an x and y axis. FIG. 2B shows an example of the difference vectors shown in FIG. 2A expressed in a two-dimensional coordinate plane. The points shown in FIG. 2B represent difference vectors, respectively. The trend of the difference vectors shown in FIG. 2A is shown in the form of a dotted ellipse.

The difference vectors in FIG. 3A are arranged in the same direction. As shown in FIG. 3B, difference vectors are distributed around the origin on the x-y coordinate system.

During the encoding operation, motion vectors obtained from each piece of image data may be coded according to the standard. In one exemplary embodiment, difference vectors may be stored in a separate memory area and used as a database, for example, to identify the tendency of difference vectors having a form, as illustrated in FIGS. 2A and 2B. Difference vectors may show a trend having a positive correlation, or having a negative correlation, or to have a form of "mvd_y=func(mvd_x)," which difference vectors of the y axis are equal to a function of the difference vectors of the x axis, with respect to the coordinate system.

When difference vectors include difference vector having a value of zero (i.e., when difference vectors show a trend of being distributed around the origin), as shown in FIGS. 3A and 3B, the difference vectors may be processed according to the conventional method without passing through encoding according to the present invention. FIGS. 3A and 3B are examples where difference vectors do not show a specific trend. Thus, the difference vectors may be processed by the conventional coding method, without passing through the axis transformation for difference vectors according to the present invention.

In contrast, when difference vectors show a tendency to have a value, other than zero, it is possible to select a central axis of the difference vectors, and to adjust the axis of the difference vectors with respect to the selected central axis. An example of step S2, transforming the difference vectors according to the trend of the difference vectors will be described below. Since image data is generally two-dimensional, although three-dimensional image data may exist, the following description will be given based on a two-dimensional coordinate system defined by the x axis and y axis.

Difference vectors may be represented by an x-axis component "mvd_x" and a y-axis component "mvd_y," and may be coordinate-transformed according to the trend of the difference vectors using Equation 1 below. The trend of the difference vectors was obtained in operation S1.

(a) $mvd\_x' = \mod(mvd\_x, mvd\_y, func\_num)$ (b) $mvd\_y' = \mod(mvd\_x, mvd\_y, func\_num)$ (1)

The coordinates of difference vectors axis-transformed by Equation 1 are re-transformed to have code values using Variable Length Coding (VLC) in operation S3, and these codes are substituted for codes of existing difference vectors in operation S4.

When bit coding has been performed using transformed difference vectors, and bit codes resulting from the bit coding have been substituted for the existing bit codes, the encoding procedure is terminated.

FIG. 1B is a flowchart illustrating a decoding procedure according to an exemplary embodiment of the present invention. Referring to FIG. 1B, the decoding method may include: performing bit decoding (S5); transforming a difference vector when a trend exists (S6); and calculating a motion vector when a difference vector has no trend.

The bit decoding operation (S5) transforms image data coded in the encoding procedure through VLC coding. When the difference vectors have no trend, that is, when most of the difference vectors have a value of zero, in the decoding operation (S5), motion vectors can be calculated using Equation 2 below.

$$mv = mvp + mvd \qquad (2)$$

In Equation 2, "mv" represents a motion vector, "mvd" represents a difference vector and "mvp" represents a motion vector predictor.

In the decoding operation (S5), image data coded to difference vectors having a trend, except for the case where the difference vectors are distributed around the origin in a coordinate system (i.e., the case where the difference vectors include a value of zero), can be transformed into difference vectors using Equation 3 below.

(a) $mvd\_x = de \mod(mvd\_x', mvd\_y', func\_num)$ (b) $mvd\_y = de \mod(mvd\_x', mvd\_y', func\_num)$ (3)

In Equation 3, the demod function is the inverse function of the mod function used in the encoding operation.

FIGS. 2A to 3B show results of the application of this method to certain image data, wherein difference vectors in FIG. 2A have a positive correlation, as shown in FIG. 2B. When the number of points existing in a region having a positive correlation is relatively large with respect to the total number of points either in an encoder or during an encoding procedure, thus is referred as the difference vectors having a positive correlation.

When the difference vectors indicate a trend as shown in FIG. 2B, the y-axis component "mvd_y" of each difference vector can be maintained at an existing value without change, and the x-axis component "mvd_x" thereof can be substituted with the difference "mvd_x−mvd_y" between the x-axis component and the y-axis component.

FIGS. 2A and 2B can be defined and transformed using the following functions.

(a) $mvd\_x' = \mod(mvd\_x, mvd\_y, func\_num) = mvd\_x - mvd\_y$ (b) $mvd\_y' = \mod(mvd\_x, mvd\_y, func\_num) = mvd\_y$ \hfill (4)

That is, difference vectors (mvd_x, mvd_y) having the trend as shown in FIG. 2B may be transformed into difference vectors (mvd_x'=mvd_x−mvd_y, mvd_y'=mvd_y) having the form as exemplified in Equation 4.

Using difference vectors transformed as exemplified in Equation 4, motion vectors can be obtained by substituting these values into Equation 2.

For example, difference vector (3, 2) can be transformed into difference vector (1, 2) using Equation 4, and difference vector (−7, −5) can be transformed into difference vector (−2, −5) using Equation 4.

When a difference vector is (3, 2), VLC requires five bits in order to express the "3." However, when a difference vector has been transformed into (1, 2), the VLC requires only three bits in order to express the "1." Consequently, it is possible to reduce the required amount of bits by as much as 2 bits. Similarly, when difference vector (−7, −5) is transformed into a difference vector (−2, −5), the required amount of bits is reduced from eight bits to four bits.

Figure 4:
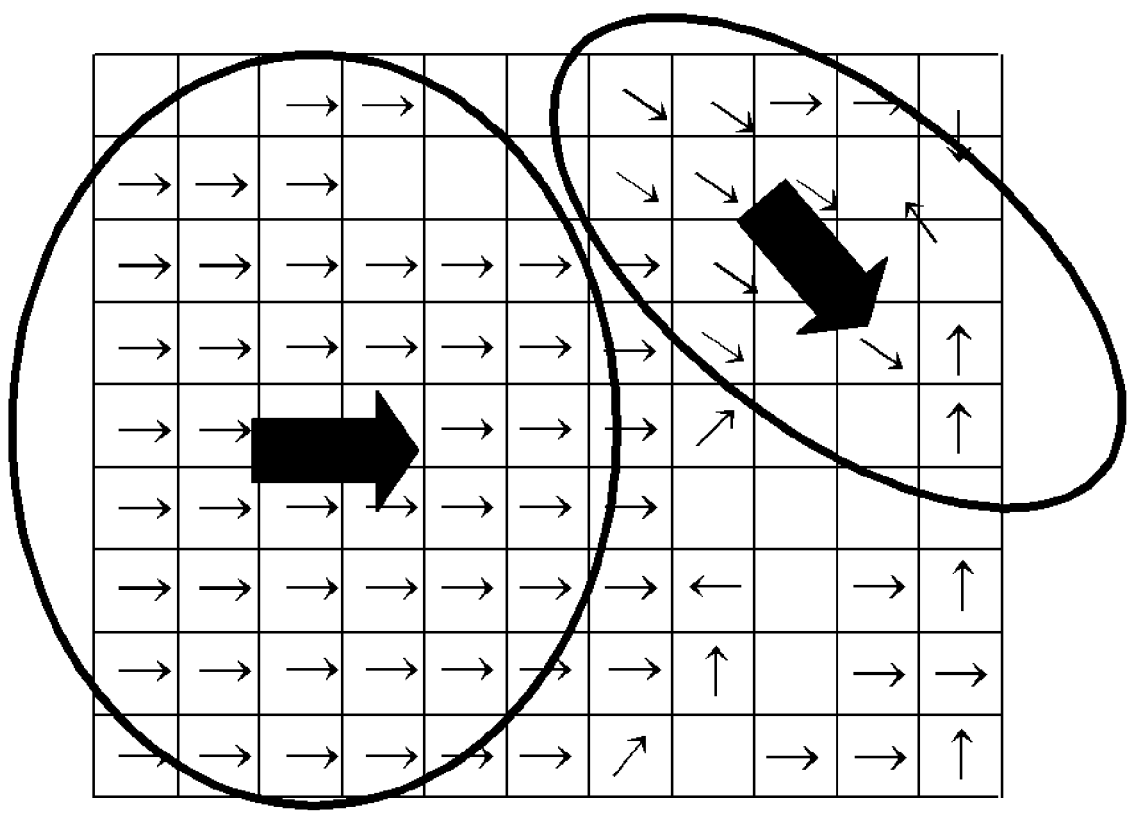
FIG. 4 is a graph illustrating another example of trends of difference vectors.

FIG. 4 is a graph illustrating another example of trends of difference vectors. As shown in FIG. 4, difference vectors of corresponding image data are distributed having two major trends. When multiple trends exist in one image, the transformation of difference vectors according to the present invention can be applied differently depending on the trend.

That is, when the difference vectors in one image to be coded have different trends, respectively, difference vectors are transformed differently depending on the trend in the image.

Figure 5:
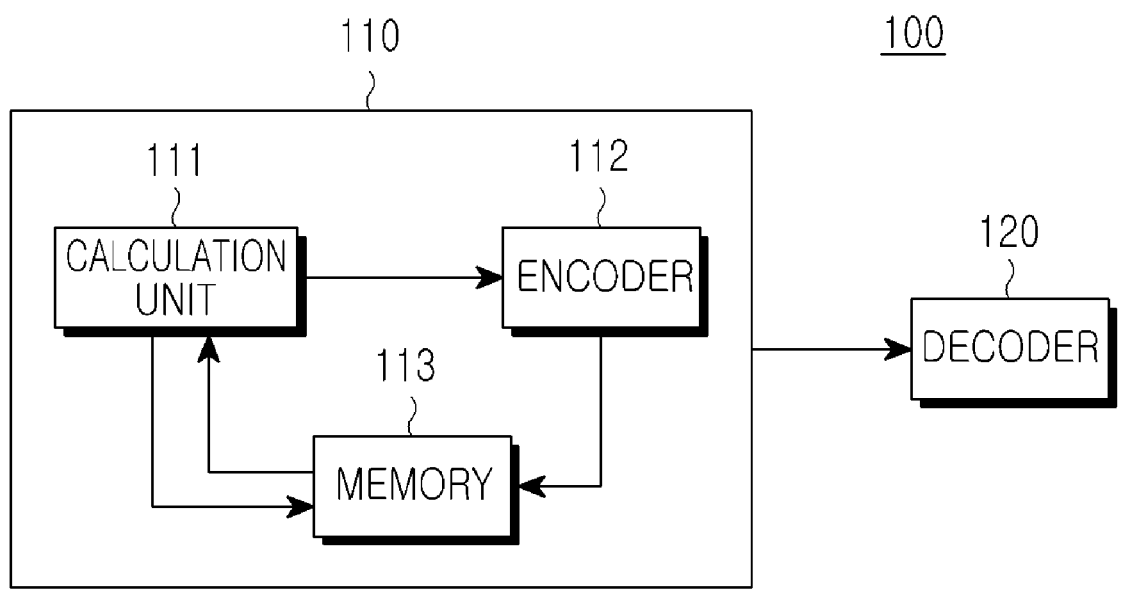
FIG. 5 is a block diagram schematically illustrating the configuration of a coding apparatus according to an exemplary embodiment of the present invention.

FIG. 5 is a block diagram illustrating the configuration of a coding apparatus according to an exemplary embodiment of the present invention. Referring to FIG. 5, an apparatus 100 for coding image data according to an exemplary embodiment of the present invention includes: an encoding section 110 for either calculating the difference vectors between motion vectors, axis-transforming the difference vectors based on a central axis of the difference vectors, and coding the axis-transformed difference vectors, or coding the motion vectors; and a decoder 120 for either inverse-transforming the difference vectors coded by the encoding section 110 into values before axis transformation, and decoding the inverse-transformed difference vectors, or decoding the motion vectors.

The encoding section 110 includes: an encoder 112 for encoding the motion vectors of image data or axis-transformed difference vectors; a memory 113 for storing motion vectors provided from the encoder 112; and a calculation unit 111 for calculating a difference vector between motion vectors from the motion vectors stored in the memory 113, axis-transforming the difference vectors with respect to the central axis of the difference vectors, and providing the axis-transformed difference vectors to the encoder 112.

According to an exemplary embodiment of the motion vector coding method of the present invention, a central axis at which the difference vectors between motion vectors of a corresponding image in the course of encoding are converged is selected (i.e., the trend of difference vectors is calculated), and the difference vectors are axis-transformed with respect to the selected central axis, so that it is possible to enhance the coding efficiency when the difference vector is not zero. Also, when data coded according to this exemplary embodiment is decoded, difference vectors are inverse-transformed into difference vectors before the axis transformation, so that it is possible to minimize the compression capacity according to coding.

Table 1 below is a table of comparison between the related art VLC and universal VLC (UVLC) methods, and VLC and UVLC methods according to an exemplary embodiment of the present invention. As illustrated in Table 1 below, the coding methods according to exemplary embodiments of the present invention can reduce the required capacity by about 7% in VLC, and by about 5% in UVLC, as compared with related art methods.

TABLE 1

| Comparison | VLC | | UVLC | |
|---|---|---|---|---|
| | Related Art | Embodiments of the Present invention | Related Art | Embodiments of the Present Invention |
| Number Of Bits [bit] | 383 | 357 | 404 | 387 |
| Rate Based On Related Art [%] | 100% | 93% | 100% | 95% |

Also, the coding method according to exemplary embodiments of the present invention can be applied without regard to the type of codec for moving images and enables a high-efficiency codec to be achieved by minimizing the number of bits required. In addition, the coding method according to exemplary embodiments of the present invention can classify difference vectors into a plurality of groups according to the trend of the difference vectors and coding the difference vectors according to groups, even within targeted image data.

While the invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A coding method comprising:
    calculating and storing, by a coding apparatus, difference vectors, wherein each of the difference vectors represents a difference between adjacent motion vectors of image data;
    selecting a central axis of the stored difference vectors based on trend information of the difference vectors;
    transforming the difference vectors based on the central axis of the difference vectors; and
    performing bit coding using the axis-transformed difference vectors.

2. The method of claim 1, further comprising transforming, the difference vectors that were axis-transformed based on the central axis into difference vectors before the axis transformation.

3. The method of claim 1, wherein calculating and storing difference vectors further comprises identifying the trend information of the difference vectors.

4. The method of claim 1, wherein, among the difference vectors, a difference vector of zero is allocated the least number of bits.

5. An apparatus for coding image data, the apparatus comprising:
    an encoding section which calculates difference vectors each of which represents a difference between adjacent motion vectors of the image data, selects a central axis of the difference vectors based on trend information of the difference vectors, axis-transforms the difference vectors based on the central axis of the difference vectors, and codes the axis-transformed difference vectors; and a decoder which inverse-transforms the difference vectors coded by the encoding section into values before the axis transformation, and decodes the inverse-transformed values.

6. The apparatus of claim 5, wherein the encoding section comprises:

an encoder which encodes either motion vectors of image data or axis-transformed difference vectors;

a memory which stores difference vectors and motion vectors provided from the encoder;

a calculation unit which calculates difference vectors between the motion vectors stored in the memory, provides the calculated difference vectors to the memory, axis-transforms the difference vectors with respect to a central axis of the difference vectors, and provides the axis-transformed difference vectors to the encoder.

7. The apparatus of claim 5, wherein the central axis of the difference vectors is selected based on trend information.

8. A method of coding motion vectors, the method comprising:

calculating, by a coding apparatus, difference vectors from a set of motion vectors;

identifying one or more trends among the calculated difference vectors;

selecting a central axis based on the identified one or more trends;

transforming the difference vectors with respect to the selected axis; and bit coding the transformed difference vectors.

* * * * *